Patented Aug. 28, 1945

2,383,446

UNITED STATES PATENT OFFICE 2,383,446

ANTIRACHITIC MATERIALS AND PROCESSES FOR THEIR PRODUCTION

William Stansfield Calcott, Woodstown, and James Waddell, Metuchen, N. J., and Hans Reinhard Rosenberg, Wilmington, Del., assignors to E. I. du Pont de Nemours & Company, Wilmington, Del., a corporation of Delaware No Drawing. Application June 4, 1941, Serial No. 396,572

5 Claims. (Cl. 204—159)

The present invention relates to new products having appreciable value in the prevention or cure of rickets. More particularly this invention refers to new species of vitamin D and provitamin D as well as processes for their production.

For many years it has been known that the human and animal body was subject to rickets and other unpleasant manifestations in the absence of adequate quantities of a substance called vitamin D. Originally this substance was obtained from cod liver oil but the amounts thereof were inadequate for many purposes. In the last twenty years a tremendous volume of research by skilled investigators has been devoted to the identification of vitamin D, and to the discovery of processes for its production. Despite the thoroughness of the investigations and the widely recognized ability of the investigators there is still much that remains unknown about vitamin D.

For some years after vitamin D was first described in the literature it was considered to be but a single product. As the information on the subject increased, however, it was finally discovered that there were many substances which conformed to the requirements of vitamin D and were capable of curing or preventing rickets. Recent information indicates that there are numerous types of vitamin D, contrary to the earlier understandings of those familiar with this art. In fact, many vitamins D which were formerly assumed to be identical are now known to be quite dissimilar to one another.

As an example, each of the following types of provitamins D, when antirachitically activated, results in the production of a separate and distinct form of vitamin D: ergosterol, epi-ergosterol, 7-dehydro-cholesterol, epi-7-dehydro-cholesterol, 22-dihydro-ergosterol, 22-23-oxido-ergosterol, 7-dehydro-sitosterol, 7-dehydro-stigmasterol, the provitamin from tubifex, the provitamin from periwinkles, etc. Each of these provitamins, when antirachitically activated, produced its own individual type of vitamin D. Each type of vitamin D is quite dissimilar in its chemical, physical and physiological characteristics to every other type of vitamin D. Consequently, it appears that there are at least ten known types of vitamin D, and probably many more that have not yet been discovered.

Some of these vitamins D, such as activated ergosterol, have a pronounced effect in the prevention or cure of rickets in rats, but are of little value in the treatment of poultry. Other types of vitamin D are of value in the prevention and cure of rickets in not only rats but poultry as well, although their effectiveness may vary somewhat. For instance, the vitamin D from antirachitically activated *Mytilus edulis* (a species of mussel) is only 60–70% as effective as the vitamin D from anti-rachitically activated 7-dehydro-cholesterol, in terms of chicken activity. In the same manner, antirachitically activated ergosterol has very little efficacy upon chickens while antirachitically activated 22-dihydro-ergosterol has a chicken activity of about 20% that of antirachitically activated 7-dehydro-cholesterol or U. S. P. Reference cod liver oil. These figures are merely illustrative of the wide variations in the physiological effectiveness of different types of vitamin D.

The precursors of vitamin D, commonly referred to as provitamins D, are obtained from vegetable or animal sources. In some instances they are obtained directly from these sources by well known extraction and purification methods. In other instances, they are obtained indirectly from inactivatable sterols by methods of chemical synthesis. There is still, however, a great need for new sources and new types of provitamin D.

A very important contribution to this art was made some years ago when Boer and his co-workers discovered that mussels and certain other invertebrata contained astonishingly large amounts of valuable provitamins D. Prior to that discovery no commercially practicable source of animal provitamin D had been known. This invention of Boer and his associates is described in U. S. Patent No. 2,163,659, issued on June 27, 1939. It is a forerunner of the invention to be hereinafter described, and in conjunction with this invention opens up a field of vast commercial importance.

It is an object of this invention to produce a new series of vitamins D and provitamins D. A further object is to obtain larger quantities of provitamins D from natural sources than were heretofore considered possible. A still further object is to obtain new types of vitamin D having a higher potency for certain purposes than any heretofore known. Additional objects will become apparent from a consideration of the following description and claims.

These objects are attained according to the hereinafter described invention wherein provitamins D are obtained from mussels of the genus Modiolus and antirachitically activated to produce a new series of vitamins D. In a more restricted sense these objects are achieved by extracting provitamin D from a species of mussels known as *Modiolus demissus* Dillwyn and subjecting the so-extracted provitamin D to antirachitic activation. In its preferred embodiment this invention is directed to the extraction of provitamin D from a species of mussels known as *Modiolus demissus* Dillwyn during the period of maximum provitamin D content thereof, and the antirachitic activation of the so-produced provitamin D with ultra-violet light.

The invention may be more readily understood from a consideration of the following illustrative examples:

EXAMPLE 1

(Isolation of the provitamin D containing sterols)

Freshly gathered mussels of the species, *Modiolus demissus* Dillwyn, are subjected to steam for a period of 5 to 10 minutes. The meat is then separated from the shell and is saponified with alcoholic potassium hydroxide in an amount of about 1 part of alcohol and $\frac{1}{10}$ part of potassium hydroxide for 1 part of the mussel meat. The saponification is carried out at the refluxing temperature and is continued over a period of from 2 to 10 hours. After completion of the saponification procedure, water is added in an amount equal to about 2 parts to 1 part of saponification mass. The mixture is then extracted with an organic solvent such as methylene chloride or diethyl ether. After the extract has been repeatedly washed with water and dried over a desiccating agent, the solvent is removed by distillation. A solid remains. This is dissolved in about 10–20 times its weight of alcohol and the sterols which contain provitamin D are allowed to crystallize out from this mixture.

The sterol fraction obtained in this manner may be recrystallized from alcohol or from other suitable solvents. If necessary decolorization is achieved by means of charcoal or other suitable agents. Finally a white sterol mixture is obtained which is analyzed for its provitamin D content spectroscopically. A provitamin D content of not less than 30% and usually about 40–50% is obtained.

EXAMPLE 2

The meat of fresh mussels (*Modiolus demissus* Dillwyn) was dried in vacuo at about 50° C. The dried mass was extracted with petroleum ether and the extract washed with water and dried over sodium sulfate. The fatty material thus extracted is obtained by distilling off the solvent and is saponified by refluxing with a solution of sodium hydroxide in 96% ethyl alcohol. The resulting soap solution is diluted with water in the ratio of 1:1 or 2:1 and is extracted with a suitable solvent such as ethyl ether or methylene chloride either continuously or two or three times in batch processes. The solvent extract are washed with water and the unsaponifiable part is obtained by distilling off the solvent. The sterol fraction is obtained by crystallization and contains about 40–50% of provitamin D.

EXAMPLE 3

(Isolation of total fat followed by activation of provitamins therein)

Freshly steamed mussel meat of the genus *Modiolus* is mixed with benzene and heated to the boiling point. The water bound in the mussel meat steam distills over and the benzene in the distillate is continuously separated and returned to the extractor. After complete removal of the water, the benzene solution is filtered. The filtrate is diluted with further amounts of solvents and subjected to ultra-violet irradiation, whereby the provitamin D present in the fat is converted into vitamin D. After completion of the activation the solvent is distilled off and the remaining vitamin D containing fat is taken up in a vegetable oil.

EXAMPLE 4

(Isolation of the pure provitamin D)

The sterol fraction prepared in accordance with Example 1 or Example 2 is converted into an ester such as the acetate by treating with acetic anhydride and pyridine. The sterol acetates thus obtained are dissolved in a mixture of benzene and light petroleum and adsorbed on aluminum oxide. Upon elution of the adsorbed sterol acetate from the aluminum oxide with benzene, first the sterols devoid of provitamin D are obtained. At the later stages of the elution the provitamin D acetate is obtained in high purity. Upon repetition of this adsorption operation, which is well known in the art, pure provitamin D acetate is obtained and the pure provitamin D itself is obtained therefrom by saponification.

EXAMPLE 5

(Alternative method for isolating pure provitamin D)

The sterol fraction prepared in accordance with Example 1 or Example 2 is subjected to fractional crystallization. The sterols are dissolved in hot isopropanol in the proportion of 8 parts solvent to 1 part sterol and allowed to crystallize in the ice box. This insoluble crystalline fraction contains a higher percentage of provitamin than the original sterol mixture. Repeated crystallization from isopropanol (these later crystallization preferably carried out at room temperature) yields finally a sterol fraction which by spectroscopic examination is 100% provitamin. This compound has a melting point of about 126–126.5° C. It is further characterized by $(\alpha)_D = -108°$ (chloroform) and $(\alpha)_{5461} = -130°$ (chloroform).

This provitamin was converted to the acetate by treatment with acetic anhydride and pyridine at room temperature. The actate showed a melting point of 137–138° C., and $(\alpha)_{5461} = -96°$ (chloroform) $(\alpha)_D = -74°$ (chloroform). The 3,5 dinitrobenzoate ester of the provitamin has a melting point of 189–190° C., and $(\alpha)_{5461} = -53°$ (chloroform) $(\alpha)_D = -39°$ (chloroform). Saponification of the 3,5 dinitrobenzoate yielded a compound with the identical characteristics of the original provitamin.

We have further found that the 3,5 dinitrobenzoate of the pure provitamin may be prepared by forming the 3,5 dinitrobenzoate of the impure sterol fraction obtained from Example 1 or Example 2 (preferably after one recrystallization from isopropanol) and subsequently separating the provitamin ester from the non-provitamin sterol esters by fractional crystallization from suitable solvents such as benzene.

The physical constants of the pure provitamin indicate that it is chemically different from any other provitamin previously described in the prior art.

Example 6

(Isolation of pure vitamin D)

The sterol fraction, obtained as described under Example 1 or Example 2, was dissolved in diethyl ether and irradiated with ultra-violet light in a suitable apparatus. Subsequently the ether was distilled off and the mixture of irradiated sterols was dissolved in hot ethyl alcohol. By refrigerating this solution the bulk of the non-activatable sterols and unchanged provitamin D crystallized out and was separated from the vitamin D fraction by filtration. The ethyl alcohol filtrate was further concentrated by distillation in vacuo and the alcohol was replaced with benzene as solvent.

By treating the benzene solution with 3,5 dinitrobenzoyl chloride and pyridine and allowing to stand for 24 hours the vitamin D and accompanying irradiation products were esterified. The pyridinium chloride formed during this reaction, excess pyridine and dinitrobenzoyl chloride were removed by scrubbing the benzene solution in turn with aqueous alcohol, 10% acetic acid, 5% sodium bicarbonate solution, and water. The benzene solution of the esters, after being dried over sodium sulfate, was subjected to chromatographic adsorption by pouring it through a column of activated alumina and the chromatogram developed by washing the column with more benzene. The yellow filtrate, contained the vitamin D ester free from certain impurities which remained adsorbed on the column. This solution was taken to dryness in vacuo and the residue treated with a small amount of pure acetone. A crystalline impurity separated almost at once and was filtered off. To the acetone solution was now added a few cubic centimeters of ethyl alcohol and the solution refrigerated to obtain a good yield of the crystalline vitamin D ester.

These crystals were later filtered off and recrystallized twice from acetone. The pure vitamin D ester has a melting point of about 128–128.5° C. and a specific rotation, $(\alpha)_{5461} = +106°$ (chloroform); $(\alpha)_D = +92°$ (chloroform). By saponifying the 3,5 dinitrobenzoate ester the pure vitamin D was obtained.

It is to be understood that the foregoing examples are illustrative only of this invention. They should not be considered as a limitation thereon since the invention is of much wider applicability than these examples by themselves would indicate.

The provitamin D obtained as described above may be activated to produce a vitamin D by means of the customary activation technique. This technique is described in considerable detail in the literature and need not be referred to herein at any length. For illustrative purposes reference may be made to sources of activation such as ultra-violet light, cathode rays, as such or in the presence of catalysts, canal rays, alpha, beta and gamma rays of radioactive elements and radium emanations, X-rays, corpuscular rays, electrons of high frequency, alternating current of high frequency, electrode and/or electrodeless discharges, etc. Activation by means of ultra-violet light is preferred.

The provitamin D may be activated in the dry state, or in the vapor state and/or in solution. Likewise, the provitamin D may be present in pure or impure form; including within the latter the form in which it occurs in nature. Mixtures of two or more species of provitamin D may be activated in accordance with this invention.

With reference to mussel meat, as an illustration, the meat may be dried and subjected to activation as such or the provitamin D may be extracted therefrom and antirachitically activated in accordance with well known methods, such as those previously referred to.

This investigation has indicated that the mussel provitamin D from the genus Modiolus, and particularly the species *Modiolus demissus* Dillwyn, is surprisingly superior to any other type of provitamin D.

In place of the preferred embodiment of this invention, provitamin D from *Modiolus demissus* Dillwyn, it is to be understood that other species of the mussel genus Modiolus may be utilized as the source of provitamin D, for instance Modiolus Modiolus L.

Other names given to the preferred species, *Modiolus demissus* Dillwyn, are *Modiolus plicatula* Lam, *Volsella demissus* Dillwyn, ribbed mussel, horse mussel and plaited horse mussel. This mussel is a prolific and heretofore unused source of a new and valuable provitamin D. It contains a surprising amount of an entirely different provitamin D than any heretofore known.

Provitamin D obtained from *Modiolus demissus* Dillwyn has the following characteristics:

(1) It is precipitated with digitonin;
(2) It has a melting point of about 126–126.5° C.;
(3) It is further characterized by $(\alpha)_D = -108°$ (chloroform) $(\alpha)_{5461} = -130°$ (chloroform);
(4) Its acetate has a melting point of 137–138° C.;
(5) Its acetate is further characterized by $(\alpha)_{5461} = -96°$ (chloroform) $(\alpha)_D = -74°$ (chloroform);
(6) Its 3,5 dinitrobenzoate ester has a melting point of 189–190° C.;
(7) Its 3,5 dinitrobenzoate ester is further characterized by $(\alpha)_{5461} = -53°$ (chloroform) $(\alpha)_D = -39°$ (chloroform);
(8) When it is antirachitically activated it has a chicken activity of about 110–120% that of U. S. P. Reference cod liver oil;
(9) When it is antirachitically activated and converted to the pure vitamin D 3,5 dinitrobenzoate ester, this ester crystallized from acetone has a melting point of about about 128–128.5° C.;
(10) The pure vitamin D 3,5 dinitrobenzoate ester is further characterized by $(\alpha)_D = +92°$ (chloroform) $(\alpha)_{5461} = +106°$ (chloroform);
(11) When the provitamin is irradiated with visible light in the presence of eosin and in the absence of oxygen a bi-molecular compound is formed, that is termed a "pinacol" in line with the nomenclature in use for the bi-molecular products that are obtained by the similar irradiation of ergosterol, 7-dehydro-cholesterol, etc. This pinacol, when purified by recrystallization from chloroform-ethyl alcohol has a melting point of from about 194–195° C. with decomposition;
(12) When one mol of methane is split from this pinacol a so-called "Neo" compound is formed which has a melting point of from about 126–129° C.

These characteristics are quite different from those of any provitamin D heretofore described.

During the period of ample food supply, which is generally from May to October, the provitamin D content of all mussels appears to be appreciably higher than it is during the remainder of the year. This observation appears to be applicable not only to *Modiolus demissus* Dillwyn and other species of the Modiolus genus but to all classes and species of mussel.

By means of the present invention new and valuable types of provitamin D and vitamin D are made available for the first time. These new species occur widely in nature. In addition to the aforesaid, old sources of provitamin D are utilized to better advantage.

As many apparently widely different embodiments of this invention may be made without departing from the spirit and scope thereof, it is to be understood that the invention is not limited to the specific embodiments thereof except as defined in the appended claims.

We claim:

1. The process of obtaining provitamin D which comprises extracting said provitamin D from mussels of the species *Modiolus demissus* Dillwyn.

2. The process of obtaining increased amounts of provitamin D which comprises extracting said provitamin D from mussels of the species *Modiolus demissus* Dillwyn collected during their period of ample food supply.

3. A provitamin D extracted from mussels of the species *Modiolus demissus* Dillwyn.

4. A process of obtaining vitamin D which comprises antirachitically activating the provitamin D occurring in mussels of the species *Modiolus demissus* Dillwyn.

5. Vitamin D produced by the antirachitic activation of a provitamin D extracted from mussels of the species *Modiolus demissus* Dillwyn.

WILLIAM S. CALCOTT.
JAMES WADDELL.
HANS R. ROSENBERG.